US010384368B2

(12) United States Patent
Freund et al.

(10) Patent No.: US 10,384,368 B2
(45) Date of Patent: Aug. 20, 2019

(54) CONTOUR RAKE FACE CUTTING TOOL

(71) Applicant: Saber Diamond Tools, Inc., Villa Rica, GA (US)

(72) Inventors: David Grover Freund, Powder Springs, GA (US); Martin Bradley Neagu, Edwardsburg, MI (US); Gregory Edmon Privette, Villa Rica, GA (US)

(73) Assignee: Saber Diamond Tools Inc., Villa Rica, GA (US)

( * ) Notice: Subject to any disclaimer, the term of this patent is extended or adjusted under 35 U.S.C. 154(b) by 0 days.

(21) Appl. No.: 15/219,698

(22) Filed: Jul. 26, 2016

(65) Prior Publication Data
US 2017/0028584 A1 Feb. 2, 2017

Related U.S. Application Data

(60) Provisional application No. 62/197,170, filed on Jul. 27, 2015.

(51) Int. Cl.
| B27G 13/08 | (2006.01) |
| B27G 13/12 | (2006.01) |
| B27G 15/00 | (2006.01) |
| B23C 5/08 | (2006.01) |
| B23P 15/00 | (2006.01) |
| B23P 15/34 | (2006.01) |
| B23C 5/10 | (2006.01) |
| B27G 13/00 | (2006.01) |

(52) U.S. Cl.
CPC ............... *B27G 13/08* (2013.01); *B23C 5/08* (2013.01); *B23C 5/1081* (2013.01); *B23P 15/34* (2013.01); *B27G 13/002* (2013.01); *B27G 13/12* (2013.01); *B27G 15/00* (2013.01); *B23C 2210/0492* (2013.01); *B23C 2240/08* (2013.01)

(58) Field of Classification Search
CPC .... B23C 5/04; B23C 5/08; B23C 5/12; B23C 5/14; B23C 2210/12; B23C 2210/16; B23C 2210/088; B23C 2210/084; B23D 71/005
USPC ........................................................ 144/218
See application file for complete search history.

(56) References Cited

U.S. PATENT DOCUMENTS 1,514,709 A * 11/1924 Lyon ...................... B23C 5/207
407/100
1,713,273 A * 5/1929 Farrington ................ B23C 5/04
407/31

(Continued)

OTHER PUBLICATIONS

International Search Report dated Oct. 21, 2016 for PCT patent application No. PCT/2016/44058.

*Primary Examiner* — Shelley M Self
*Assistant Examiner* — Smith Oberto Bapthelus
(74) *Attorney, Agent, or Firm* — Altera Law Group, LLC

(57) ABSTRACT

A contoured rake face cutting tool and method of making is disclosed. A rotary cutting tool with a plurality of teeth can cause damage to a work piece during cutting. By orienting the cutting angle of the teeth relative to the rotational central axis to high shear angle such as 50 or 70 degrees, the tool creates a high compression cut which is cleaner and less damaging to the work piece. The cutting surface itself is profiled, i.e. non-planar, such as concave or convex or other non planar shape, which is preferably formed into an ultra-hard material which is supplied for use in a planar form.

8 Claims, 19 Drawing Sheets

(56) References Cited

U.S. PATENT DOCUMENTS

| | | | | |
|---|---|---|---|---|
| 4,655,648 A * | 4/1987 | Hellbergh | B23C 5/16 | 144/218 |
| 4,764,059 A * | 8/1988 | Wale | B23C 5/2265 | 407/114 |
| 5,626,444 A * | 5/1997 | Campian | B23C 3/00 | 407/54 |
| 6,234,725 B1 * | 5/2001 | Campian | B23C 5/1009 | 407/54 |
| 6,484,766 B1 * | 11/2002 | Falatok | A01G 23/067 | 144/218 |
| 6,883,412 B1 * | 4/2005 | Turfitt | B23D 61/04 | 83/835 |
| 8,176,825 B1 * | 5/2012 | Isaacson | B23C 5/1081 | 83/835 |
| 8,579,559 B2 * | 11/2013 | Nagase | B23C 3/34 | 409/132 |
| 8,974,155 B2 * | 3/2015 | Dressler | B23C 5/04 | 144/236 |
| 9,073,132 B2 * | 7/2015 | Cha | B23C 5/18 | |
| 9,381,589 B2 * | 7/2016 | Arakawa | B23H 7/06 | |
| 9,592,562 B2 * | 3/2017 | Harif | B23B 27/1611 | |
| 2003/0154840 A1 * | 8/2003 | O'Brien | A45C 11/20 | 83/835 |
| 2004/0178528 A1 * | 9/2004 | Diehl | B23B 1/00 | 264/2.7 |
| 2005/0031421 A1 * | 2/2005 | Inglis | B23C 5/1081 | 407/53 |
| 2005/0123365 A1 * | 6/2005 | Goudemond | B23B 27/141 | 407/113 |
| 2005/0164620 A1 * | 7/2005 | Amamoto | B23C 5/006 | 451/548 |
| 2007/0207715 A1 * | 9/2007 | Webb | B23B 27/145 | 451/540 |
| 2007/0266840 A1 * | 11/2007 | Ottenwaelder | B23C 5/18 | 83/835 |
| 2007/0278017 A1 * | 12/2007 | Shen | E21B 10/5673 | 175/426 |
| 2008/0264696 A1 * | 10/2008 | Dourfaye | E21B 10/573 | 175/428 |
| 2009/0022561 A1 * | 1/2009 | Winebrenner | B23B 51/02 | 408/230 |
| 2009/0155004 A1 * | 6/2009 | Jansson | B23C 5/06 | 407/40 |
| 2010/0314176 A1 * | 12/2010 | Zhang | E21B 10/573 | 175/383 |
| 2011/0123280 A1 * | 5/2011 | Hobohm | B23C 5/1081 | 407/34 |
| 2011/0176879 A1 * | 7/2011 | Jonker | B22F 7/062 | 408/144 |
| 2011/0305533 A1 * | 12/2011 | Kisselbach | B23C 5/04 | 407/48 |
| 2012/0051852 A1 * | 3/2012 | Choi | B23C 5/2441 | 407/44 |
| 2012/0282045 A1 * | 11/2012 | Dressler | B23C 5/04 | 407/58 |
| 2013/0020133 A1 * | 1/2013 | Webb | E21B 7/24 | 175/57 |
| 2013/0118813 A1 * | 5/2013 | Scott | E21B 10/46 | 175/432 |
| 2013/0209184 A1 * | 8/2013 | Barry | B23C 5/10 | 407/54 |
| 2013/0223942 A1 * | 8/2013 | Matsuo | B23C 5/109 | 407/42 |
| 2013/0276970 A1 * | 10/2013 | Linnane | B23B 27/145 | 156/252 |
| 2013/0294849 A1 * | 11/2013 | Heinloth | B23C 5/08 | 407/45 |
| 2013/0322975 A1 * | 12/2013 | Tan | B23P 11/00 | 409/80 |
| 2013/0322976 A1 * | 12/2013 | Tan | B23P 11/00 | 409/131 |
| 2014/0119843 A1 * | 5/2014 | Cha | B23C 5/18 | 407/53 |
| 2014/0186129 A1 * | 7/2014 | Freund | B23C 5/18 | 407/56 |
| 2014/0234038 A1 * | 8/2014 | Freund | B23C 5/18 | 407/56 |
| 2015/0041225 A1 * | 2/2015 | Jonker | B22F 7/08 | 175/434 |
| 2015/0047910 A1 * | 2/2015 | Chen | E21B 10/55 | 175/336 |
| 2015/0097321 A1 * | 4/2015 | Kasonde | B22F 3/14 | 264/626 |
| 2015/0135905 A1 * | 5/2015 | Maurer | B23B 51/02 | 76/115 |
| 2015/0136738 A1 * | 5/2015 | Ndlovu | B01J 3/062 | 216/109 |
| 2015/0147127 A1 * | 5/2015 | Shpigelman | B23C 5/10 | 407/54 |
| 2015/0239052 A1 * | 8/2015 | Trumble | B23D 61/04 | 83/835 |
| 2017/0028584 A1 * | 2/2017 | Freund | B27G 13/08 | |
| 2017/0106454 A1 * | 4/2017 | Matsuo | B23C 5/10 | |
| 2018/0065197 A1 * | 3/2018 | Duck | B23B 51/048 | |
| 2018/0065894 A9 * | 3/2018 | Can | B01J 3/062 | |

* cited by examiner

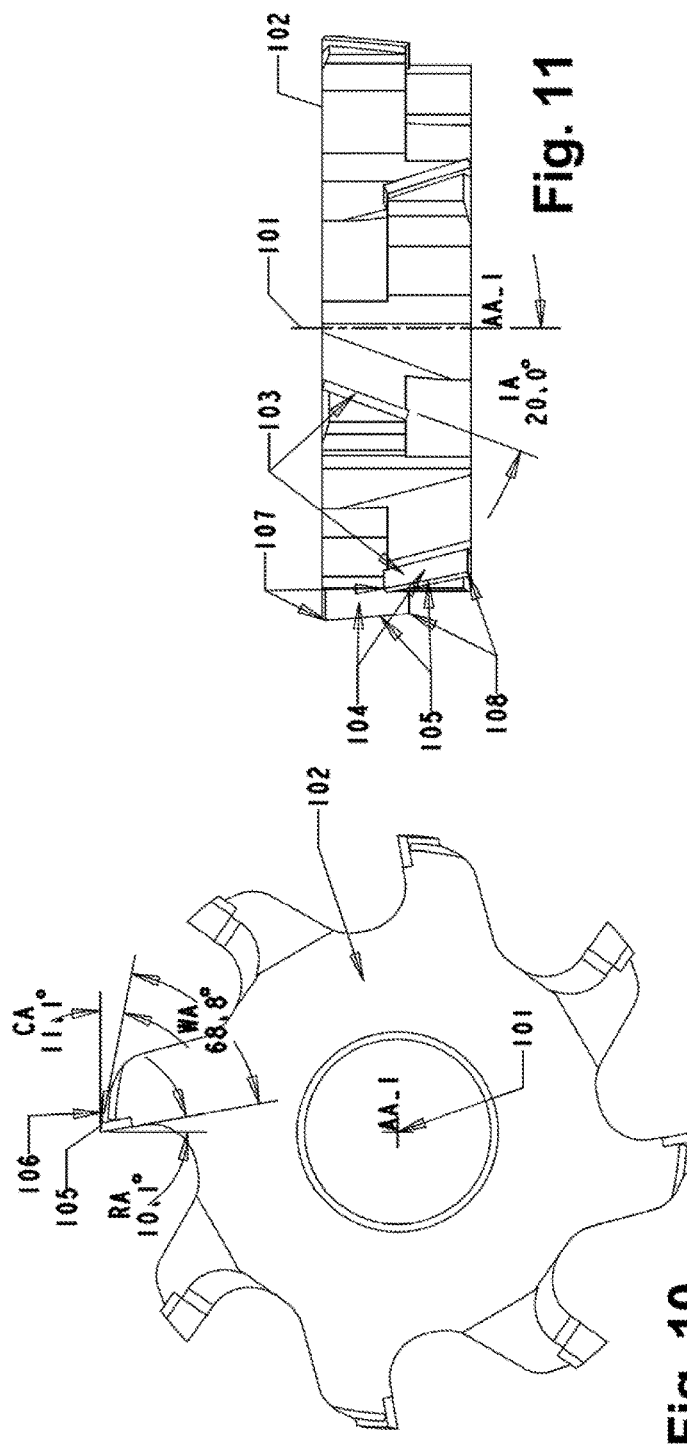

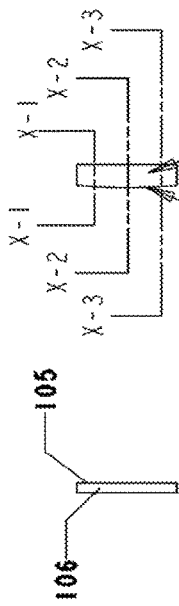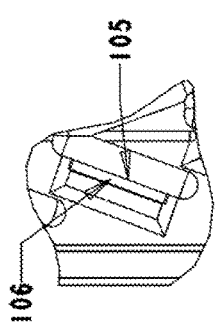

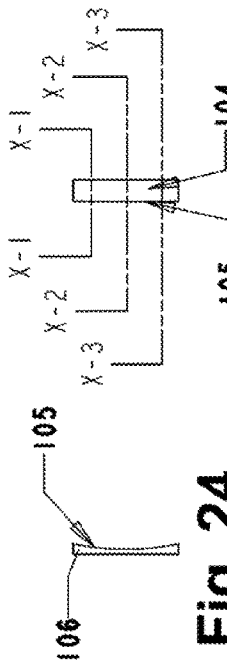
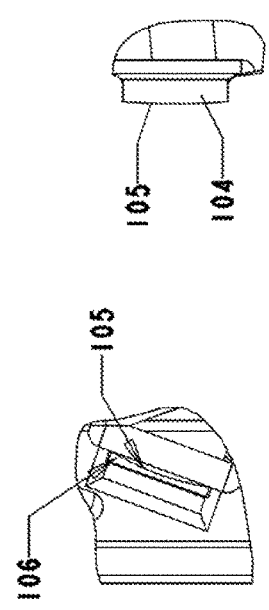
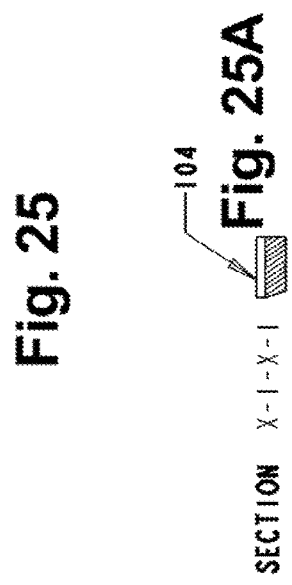
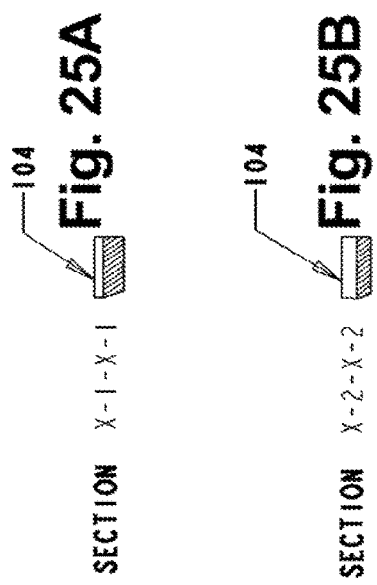

CONTOUR RAKE FACE CUTTING TOOL

INCORPORATION BY REFERENCE

This application hereby claims priority from and incorporates by reference U.S. Provisional patent application Ser. No. 62/197,170 filed 27 Jul. 2015, entitled High Shear Cutting Tool.

BACKGROUND

Cutting or machining tools for rotary drive cutters may be used to drill holes and cut shapes in different types of metals and woods. However, cutting tools may not always leave a clean cut and tend to leave a lot of debris, such as chips and dust, on the top and bottom of the work piece. Further, due to the low compression cut, the cutting tools cause a lot of movement of the work piece which also results in a rougher cut and surface chips on the work piece. As can be seen, there is a need for a cutting tool that provides less movement and less chipping, particularly for wood and composite materials.

Cutting tools that machine a work piece by utilizing cutting edges that rotate around the center axis of a basically cylindrical tool have generally been produced in one of two types.

One type is made entirely of one material such as high speed steel or tungsten carbide and having one or more helical or spiral cutting edges where each cutting edge is made up of one continuous edge and all the various cutting geometry such as inclination angle (IA), rake angle (RA), and clearance angle (CA) are continuous throughout the length of the cutting edge. Also due to the nature of a helix or spiral the rake face of these tools would have no planer/flat surfaces.

The other method of design and manufacture of cutting tools involves having an essentially cylindrical tool body that is made of a steel alloy, typically carbon steel, with cutting plates or tips (teeth) attached to the body by brazing, soldering, adhesive bonding, etc. In the case of the invention the cutting tip material is an ultra-hard material, Polycrystalline Diamond (PCD).

In these types of cutting tools there are four basic cutting geometry angles that affect the performance of the tool. 1) the angle of the rake face (RA), and 2) the flank relief or radial clearance angle (CA), 3) RA and CA angles combine to create a wedge angle (WA) which determines the relative edge sharpness, and the fourth angle between the cutting edge of the tip and the axial centerline of the tool rotation. This is referred to as inclination angle (IA) or "shear" angle. This inclination angle (IA) is zero or the cutting edge is parallel to the centerline of axial rotation then it is perpendicular to the direction of motion of the tip as it progresses through the cut.

SUMMARY

This summary is intended to assist the reader in understanding the full disclosure but is not intended to limit the scope of the claims.

The present disclosure relates to a cutting tool with a cutting tip having a profile which is non-planar, such as concave or convex.

In one embodiment a cutting device has a cylindrical body having a central rotational axis, an outer peripheral surface and a central rotational axis and a central midline; a plurality of cutting teeth/tips extending from said surface including a first upper set of teeth generally on one side of the midline and a second lower set of teeth generally on the other side of the midline, at least one of said teeth being oriented at a high shear angle relative to said axis of about 50 degrees or greater, where the upper set of teeth are oriented at a downward shear angle and the upper set of teeth are oriented at an upward shear angle. High shear is typically defined as an angle greater than 30 degrees, but can also be defined as an angle greater than 50 degrees. Higher shear angle tool provide a better faster, cleaner cut but is much more difficult to design.

Also disclosed is cutting tool wherein said cutting teeth/tips are all oriented at a high shear angle of 50 degrees or greater.

Also disclosed is a cutting tool wherein the concavity is formed from multiple straight segments aligned end to end form a concavity and complex curvatures such as sinusoid and serrated edges.

Also disclosed is cutting tool wherein the teeth include:
a. a generally vertical leading wall with a cutting edge;
b. a first sloping wall abutting said cutting edge and sloping downwardly toward the central axis and away from said cutting edge.

Also disclosed is cutting tool further including a second sloping wall abutting said first sloping way and sloping downwardly toward the central axis and away from the cutting edge at an angle equal to or greater than the slope of the first wall.

Also disclosed is cutting tool wherein said first and second sloped walls are discontinuous and separated by a further connecting wall.

Also disclosed is cutting tool further including a concave section between said second wall and said base.

Also disclosed is a cutting tool wherein the cutting edge is concave.

Also disclosed is a cutting tool wherein the cutting edge is convex.

Also disclosed is a cutting tool which has an irregular non planar surface.

Also disclosed is cutting tool having a cylindrical body having a central rotational axis, an outer peripheral surface and a central rotational axis and a central midline; a plurality of cutting teeth extending from said surface including a first upper set of teeth generally on one side of the midline and a second lower set of teeth generally on the other side of the midline, at least one of said teeth being oriented at a high shear angle of generally 50 degrees or greater relative to said axis.

Also disclosed is cutting tool having a cylindrical body having a central rotational axis, an outer peripheral surface and a central rotational axis and a central midline; a plurality of cutting teeth extending from said surface including a first upper set of teeth generally on one side of the midline and a second lower set of teeth generally on the other side of the midline, at least one of said teeth being oriented at a high shear angle relative to said axis of about 50 degrees or greater, where the upper set of teeth are oriented at a downward shear angle and the upper set of teeth are oriented at an upward shear angle and further wherein at least one tooth includes a leading cutting edge and a wall sloping away therefrom on an edge trailing the cutting edge, to provide cutting clearance.

Also disclosed is a method of forming a clean cutting rotary tool on a cylindrical shaft comprising any or all of the following steps in any order of:
forming a plurality of teeth on the surface of the shaft;
forming a leading cutting edge on the each tooth;

orienting the teeth such that that are at a shear angle of 50 degrees or greater;

forming a trailing edge of the teeth so that it has a first and second step back clearance wall sloping away from the leading edge, the second step having a greater clearance slope than the first step.

Also disclosed is a method further including forming a discontinuity between the first and second sloped walls.

Also disclosed is a cutting device having a cylindrical body having a central axis, an outer peripheral surface, and a plurality of cutting tips extending from said surface. The cutting tips are separate or separable from the tool body and are affixed to it through brazing or other methods. The cutting tips are in one or more rows where if there are more than one row, the rows are overlapping so as to not have gaps in the cut. At least one of the rows may be at a high shear angle of about 50 degrees or greater. The tips in the row have a profiled, non-flat, non-planer rake face surface. This surface profile to be curved in either a concave, convex shape or may be of other variable surface forms that are non-flat/non-planer in form. Preferably, the cutting tips are to be of an ultra-hard material, Polycrystalline Diamond (PCD).

BRIEF DESCRIPTION OF THE DRAWINGS

FIG. 10 is a perspective view of another cutting tool showing various cutting tip angular measurements.

FIG. 11 is a side plan view of the tool of FIG. 10.

FIG. 12 is a perspective view of the tool of FIG. 10.

FIG. 18 is a close up fragmentary view of one tip/tooth.

FIG. 19 is a further close up fragmentary view of the tip/tooth in FIG. 18.

FIG. 20 is a close up side view of the cutting surface of one tip/tooth.

FIG. 21 is a view like FIG. 20.

FIGS. 21a, 21b, 21c are views taken from FIG. 21 along lines x-1, x-2 and x-3 as shown.

FIG. 22 is a view like FIG. 18 except for a concave/profiled cutting surface.

FIG. 23 is a view like FIG. 19 except for a concave/profiled cutting surface.

FIG. 24 is a view like FIG. 20 except for a concave/profiled cutting surface.

FIG. 25 is view like FIG. 21 except for a concave/profiled cutting surface.

FIGS. 25a, 25b, 25c are views taken from FIG. 24 along lines x-1, x-2 and x-3 as shown.

DETAILED DESCRIPTION

Figure 1:
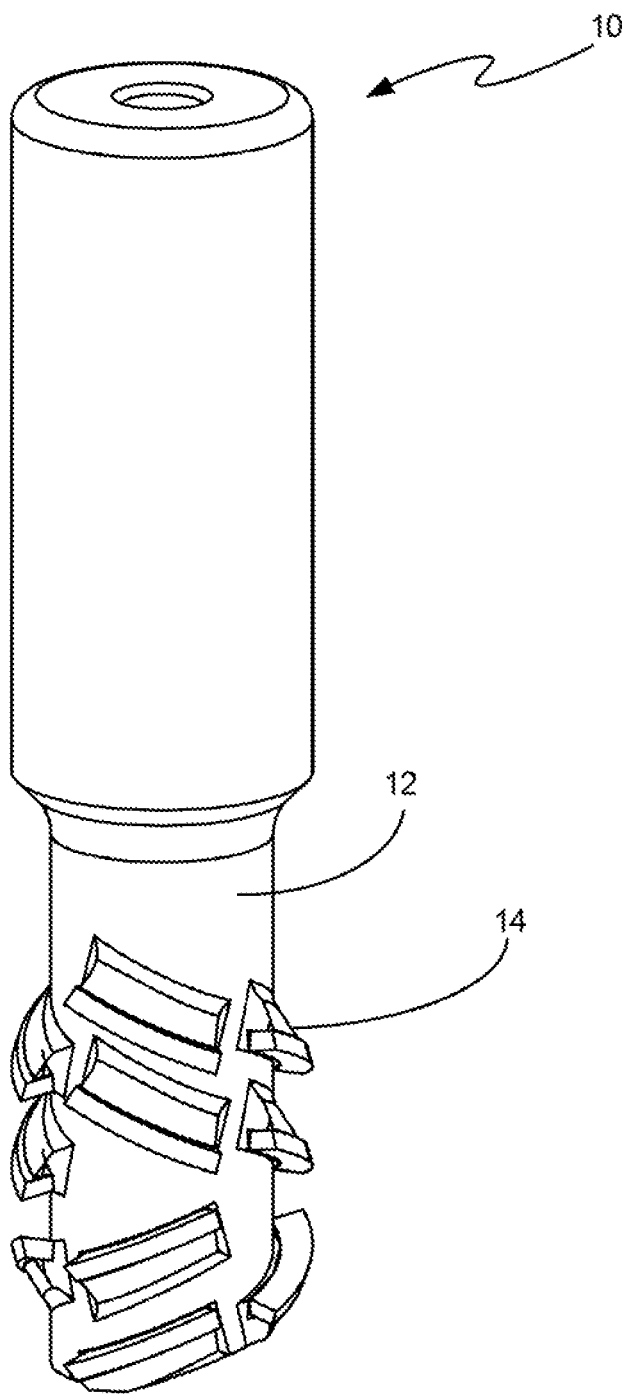
FIG. 1 is a plan view of a cutting tool.
Figure 2:
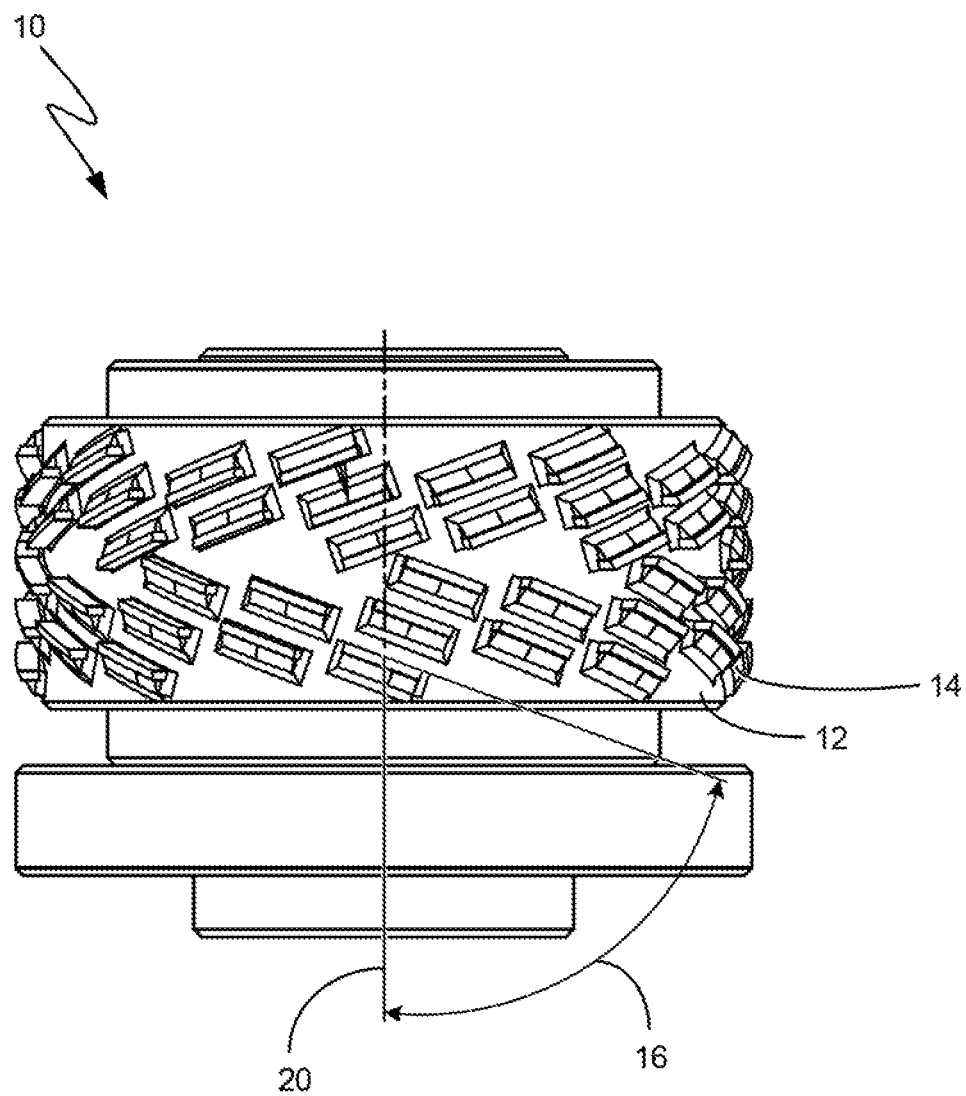
FIG. 2 is a side plan view of a second alternate cutting tool with cutting angle indicated.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

In, cutting and routing of materials, particularly fibrous materials such as wood, there is a problem of splintering at the edges. Prior attempts to solve this problem have generally been less than fully effective.

The present disclosure shows a product and method for overcoming these past problems.

Broadly, several embodiments are disclosed which provide a cutting device having a body such as of metal; a plurality of cutting teeth, an abrasive material attached to or milled from the body at the peripheral edge of the teeth and a cutting edge embedded in the abrasive material having a high edge shear angle greater. The shear angle can be greater than 50 degrees, greater than 55 degrees, greater than 60 degrees, greater than 65 degrees, greater than 70 degrees, greater than 75 degrees, greater than 80 degrees, greater than 85 degrees, or any increment there between such as greater than 56, 57, 58, 59 degrees (hereinafter referred to as the enhanced shear angle.

The present disclosures provide a high shear cutting tool providing a clean cut that enhances the stability of the work piece. The high shear cutting tool has a cutting angle that at an enhanced shear angle. The compression action of the high shear cutting angle pushes the cutting action into the work piece which provides a cleaner cut, better surface finish and less movement of the work piece. In effect, the cut is more akin to a punch action which creates a clean cut. The present disclosure provides a user with the ability to achieve enhanced performance by using abrasion resistant material with the high shear angles.

Referring now to FIGS. 1 through 6, the present invention may include a high shear cutting tool 10. The high shear cutting tool 10 may include a body 12, teeth 14 which may also have an abrasive deposited thereon, such a diamond, and a cutting edge shear angle 16. The shear angle is an industry standard term measuring the angle of the teeth 14 relative to the vertical rotational axis 20. The body 12 may be made of steel or any strong material that may be used for holding the teeth. The body 12 may provide a base for holding the abrasive material in place and provides a platform for maintaining the high shear cutting angles.

Figure 3:
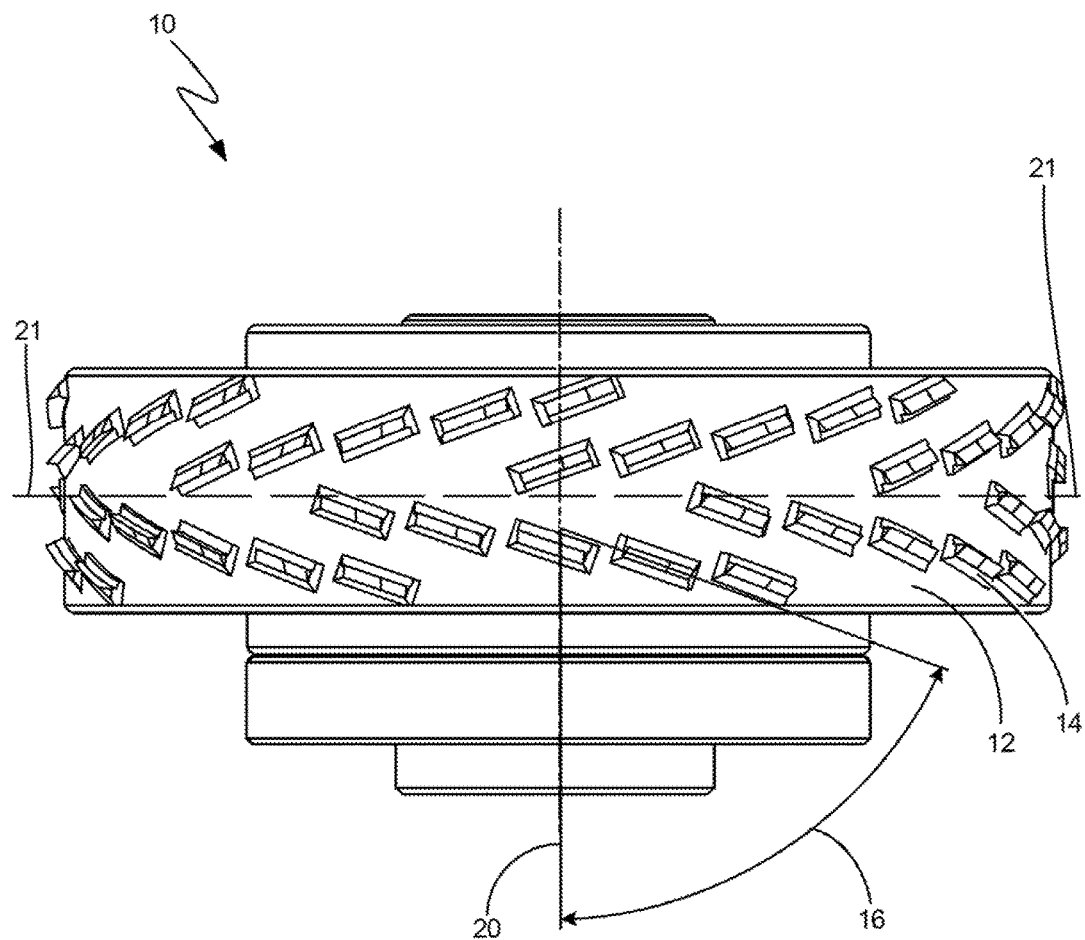
FIG. 3 is a side plan view of a third alternative cutting tool with cutting angle indicated.

Note that the teeth 14 may be provided in two sets on either side of a center or mid-line 21 as shown in the FIG. 3. The upper teeth are angled downwardly and the lower teeth are angled upwardly, preferably at the same shear angle (although they may be different angles as needed). The teeth may intersect the line so there is no gap between teeth, or a gap may be desired as in FIG. 4, where special treatment is called for.

The abrasive material or teeth 14 may provide a wear resistant cutting edge. The abrasion resistant material 14 may optionally be applied to the teeth. The final proper shear angle enables the tool to cut the work piece in a clean and more chip free manner. The cutting edge shear angle 16 may be a cutting edge with a shear angle that is at an enhanced shear angle or greater than about 50 degrees.

The proper shear angles may enable the tool to cut the work piece effectively. A variety of shear angles may be used to give different results. Further, in certain embodiments, different hook angles may also be incorporated which may enhance the performance and reduce the chipping on the top and bottom surfaces of the work piece.

Figure 4:
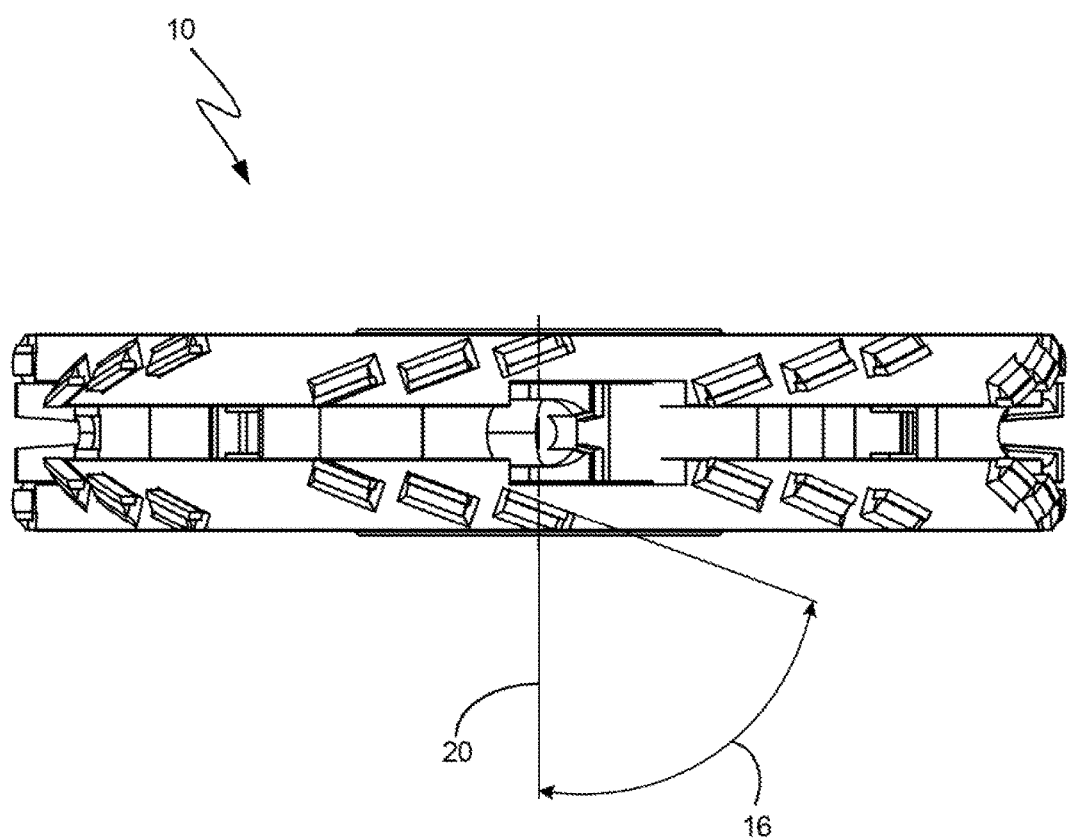
FIG. 4 is a side plan view of a fourth alternative cutting tool with cutting angle indicated.
Figure 4A:
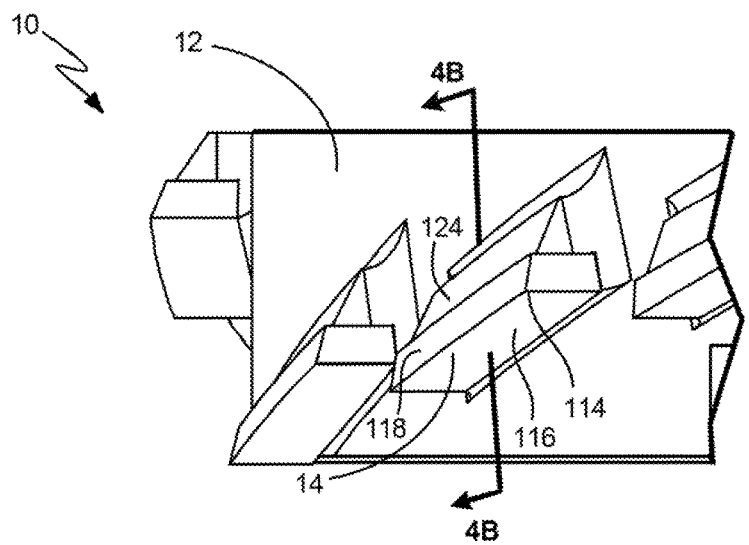
FIG. 4A is a close up fragmentary view of a section of FIG. 4.

In addition to the enhanced shear angle, it may be advantageous to provide a stepped clearance angle(s) on the trailing edge of each tooth. FIG. 4A shows a tooth 14 with a leading cutting edge 114 formed by the intersection of a vertical wall 116 and a first sloped wall 118. The angle of wall 118 (shown in FIG. 4C as 122) may be from 0 degrees (flat) to approximately 35 degrees, including any of the following 5, 10, 15, 20, 25, 30, and 35 degrees in one degree increments.

In addition to this first sloped wall 118, a second sloped wall 124, adjoining 122 may be further sloped away from the first wall 118 at an angle 128 between 0-45 degrees from the vertical, or toward the central axis, (including any of the following 5, 10, 15, 20, 25, 30, 35, 40 and 45 degrees), which means it may be equal to or greater slope that the first wall.

Figures 4B, 4C:
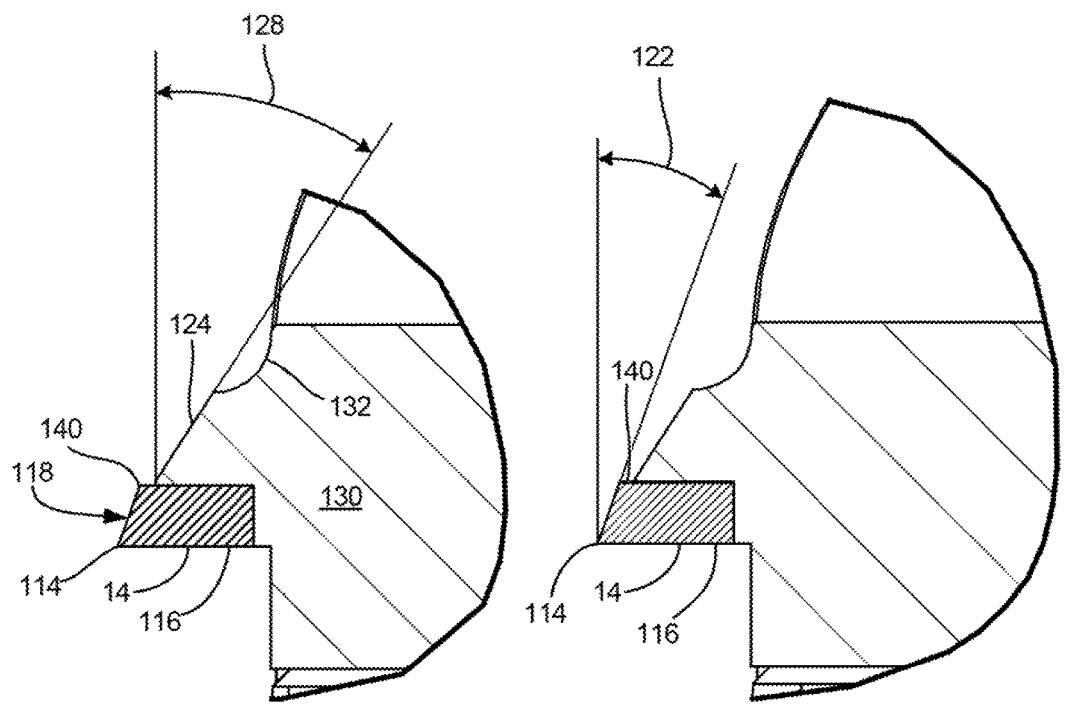
FIG. 4B is a sectional view of FIG. 4A taken along lines 4B-4B.
FIG. 4C is a view like FIG. 4B but showing a different angular dimension.
Figure 5:
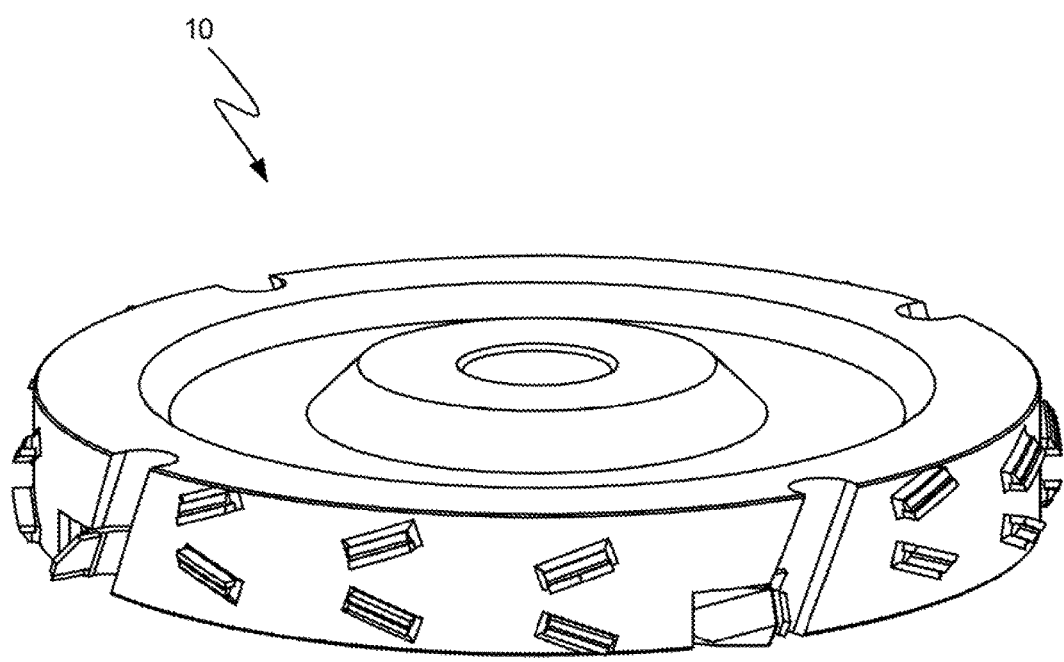
FIG. 5 is a side perspective view of a fifth alternative cutting tool.
Figure 6:
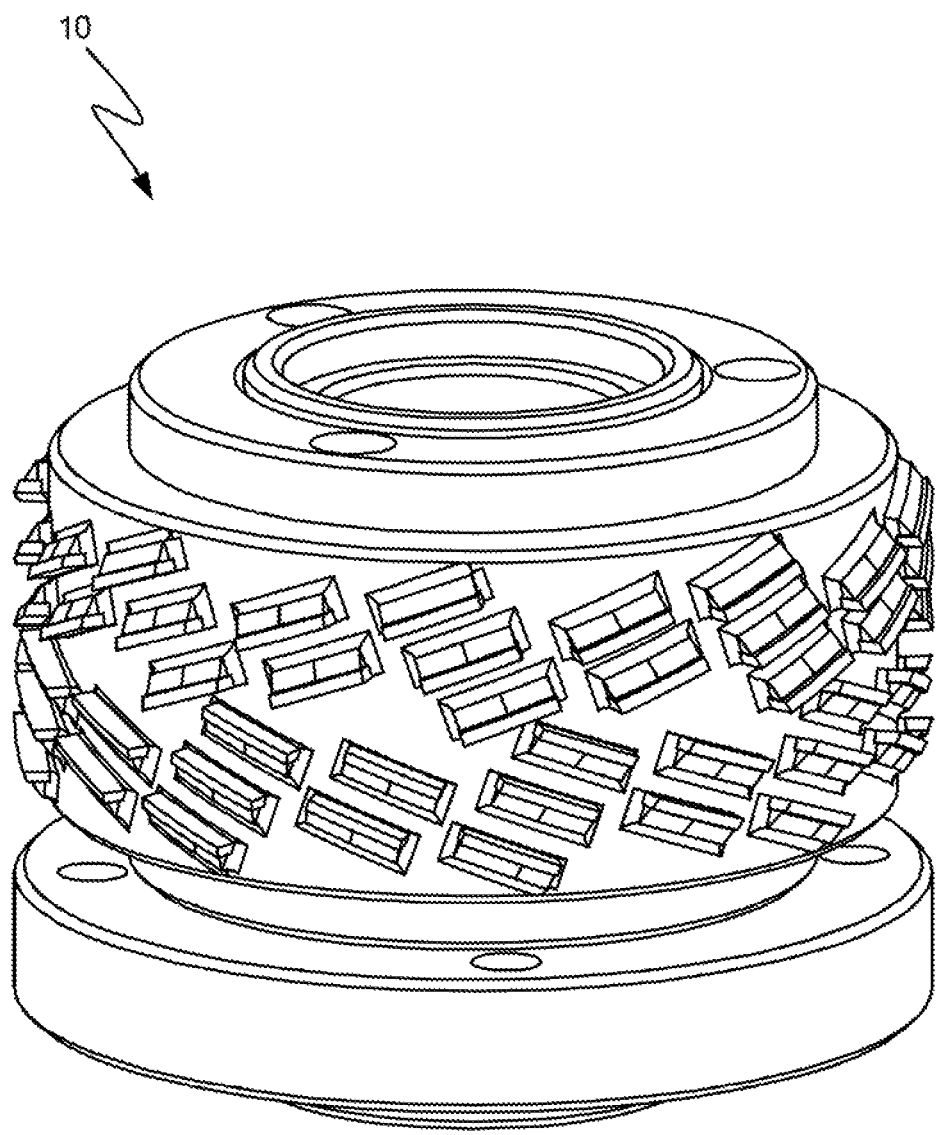
FIG. 6 is a perspective view of the subject matter in FIG. 2.

In the preferred embodiment, the second slope is greater than the first as shown in FIGS. 4A, 4B and 4C.

Optionally, the space between the second slope 124 and the base of the tool has a convex shape 132.

There may also be a stepped region (discontinuity) 140 formed between the first and second sloped wall which offsets the first and second sloped walls by a vertical section.

Therefore a method of forming a tooth includes forming a first cutting edge with a vertical leading wall, a first sloping wall leading away from said cutting edge at a first angle and forming a second slope wall adjacent said first wall at a second angle, preferably greater than the first angle, so that the slope away from the cutting edge in increasing.

There may also be a stepped region 140 formed between the first and second sloped wall which offsets the first and second sloped walls by a vertical section.

A method of making the device may include the following.

A person may first obtain a steel tool body which incorporates the proper high shear angles, then attach an abrasion resistant material or teeth, to the steel body, and then grind or EDM the proper shear angles to enable the tool to cut the work piece in a high compression mode (i.e. at an enhanced shear angle or greater than 50 degrees). The invention may produce an end piece such as a straight or curved section made of wood, metal, plastic, or various other materials that has a smooth, clean cut, chip free surface and clean cuts on the top and bottom of the piece due to the effect of the high compression shear angles (greater than 50 degrees).

It should be understood, of course, that the foregoing relates to exemplary embodiments of the invention and that modifications may be made without departing from the spirit and scope of the invention as set forth in the following claims.

Alternate Embodiment

An alternative way of producing a cutting tool and the cutting tool itself is detailed below.

Figure 29:
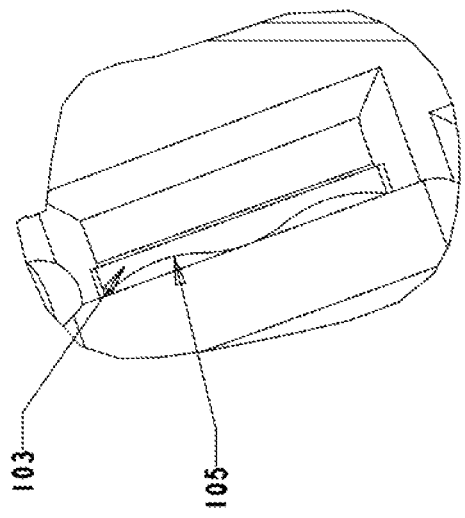
FIG. 29 is a side plan view of FIG. 28.
Figure 28:
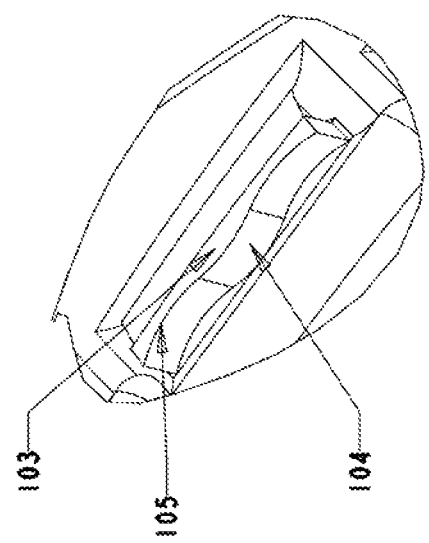
FIG. 28 shows a close up perspective view of a tip/tooth like FIG. 19 except having an irregular/serrated surface.

In the preferred embodiment, the cutting tool has a Polycrystalline Diamond (PCD) cutting surface with an inclination angle (IA) greater than 45 degrees and a non-planar rake face 104 FIGS. 8-12, on the cutting plates or tips 103. Non-planar includes any non-flat curved or irregular shape including but not limited to concave, convex, serrated, sinusoidal, planar segments abutting end to end to be form a curve of planar segments and the like. FIGS. 28 and 29 show such a surface.

Cutting tools that machine a work piece by utilizing cutting edges that rotate around the center axis 101 of a basically cylindrical tool have generally been produced in one of two types.

One type is made entirely of one material such as high speed steel or tungsten carbide and having one or more helical or spiral cutting edges where each cutting edge is made up of one continuous edge and all the various cutting geometry such as inclination angle (IA), rake angle (RA), and clearance angle (CA) are continuous throughout the length of the cutting edge. Also due to the nature of a helix or spiral the rake face of these tools would have no planer/flat surfaces.

The other method of design and manufacture of cutting tools involves having an essentially cylindrical tool body 102 that is made of a steel alloy, typically carbon steel, with cutting plates or tips 103 attached to the body by brazing, soldering, adhesive bonding, etc. In the case of this embodiment the cutting tip 103 material is an ultra-hard material, such as Polycrystalline Diamond (PCD), though other materials are possible.

Figure 8:
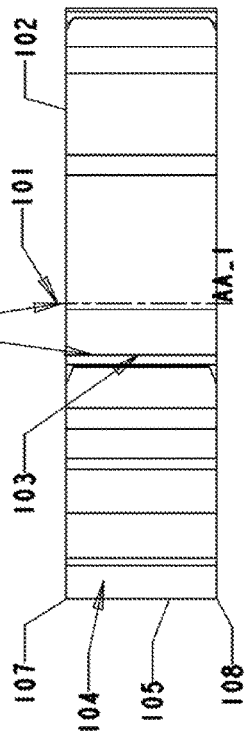
FIG. 8 is a side plan view of the tool of FIG. 7.
Figure 7:
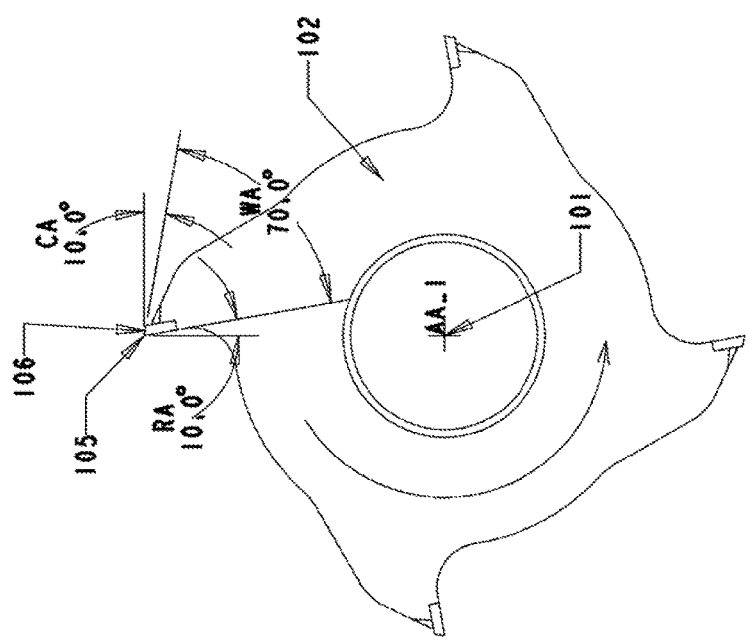
FIG. 7 is a top plan view of a cutting tool.
Figure 13:
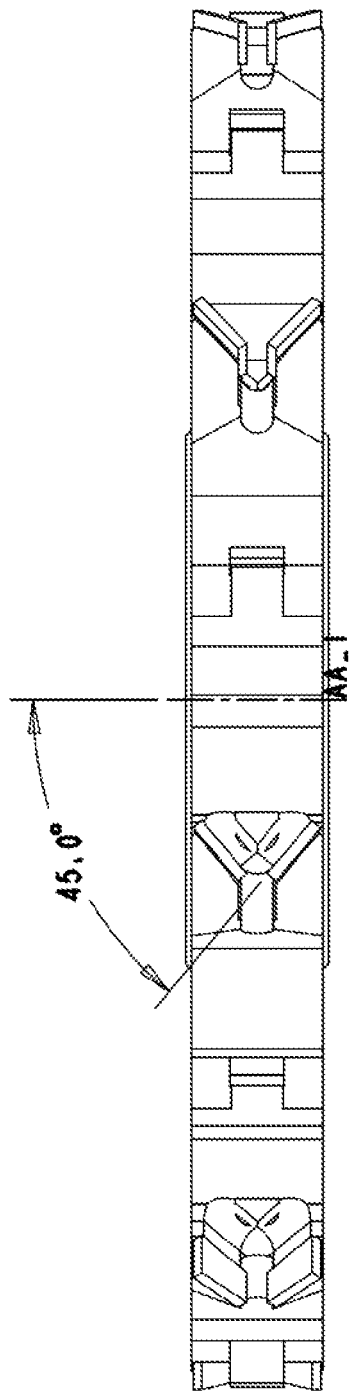
FIG. 13 is a side plan view of further alternate cutting tool.

In these types of cutting tools there are four basic cutting geometry angles that affect the performance of the tool. FIG. 7 shows the angle of the rake face (RA), and the flank relief or radial clearance angle (CA). These two angles combine to create a wedge angle (WA) which determines the relative edge sharpness. The fourth angle, inclination angle (IA) is shown in FIG. 8. This is an angle between the cutting edge of the tip and the axial centerline "I" of the tool rotation. This is referred to as inclination angle (IA) or "shear" angle. In the example in FIGS. 7-9 this inclination angle (IA) is zero or the cutting edge is parallel to the centerline of axial rotation I and perpendicular to the direction of motion of the tip as it progresses through the cut.

Figure 16:
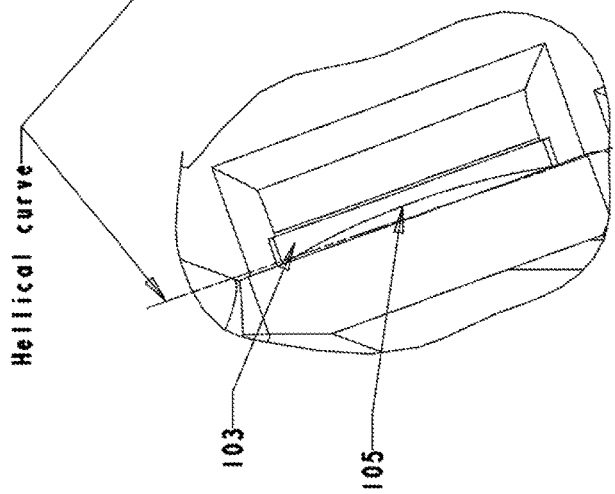
FIG. 16 is a close up fragmentary view of FIG. 17.
Figure 16A:
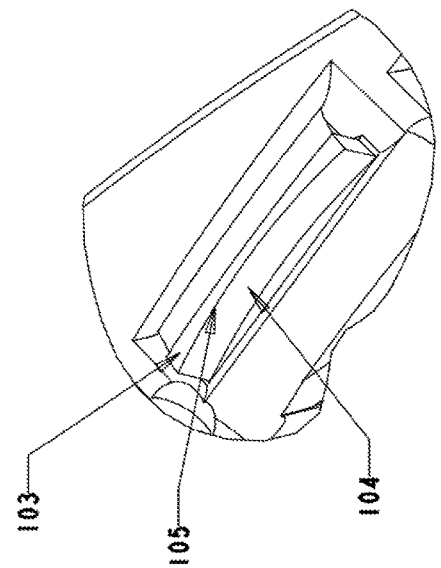
FIG. 16A is a perspective view of the subject matter in FIG. 16.

FIGS. 16 and 22 shows the profiled/concave rake face tip 105 (exaggerated for visibility) in the tool body as viewed from the flank 106 side with the cutting edge 105 visible.

Figure 27:
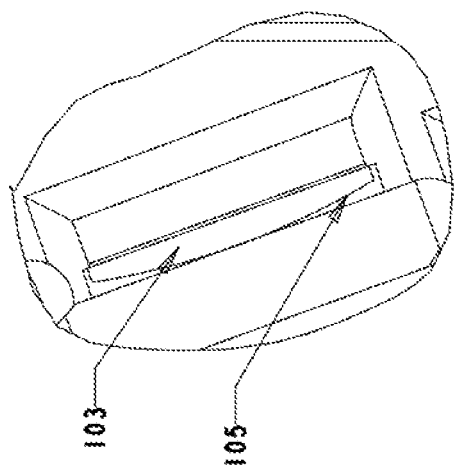
FIG. 27 a side plan view of FIG. 26.
Figure 26:
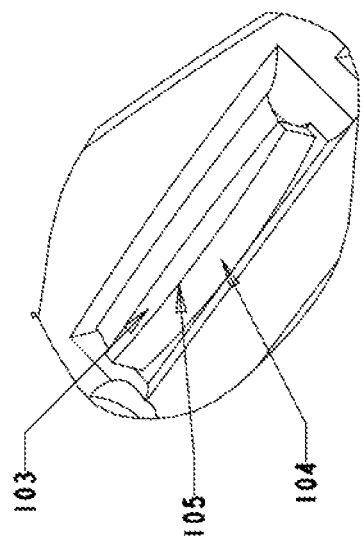
FIG. 26 shows a close up perspective view of a tip/tooth like FIG. 19 except having a convex surface.

Note that convex, such as shown in FIGS. 26-27, is also an effective profiling of the rake face.

Figure 9:
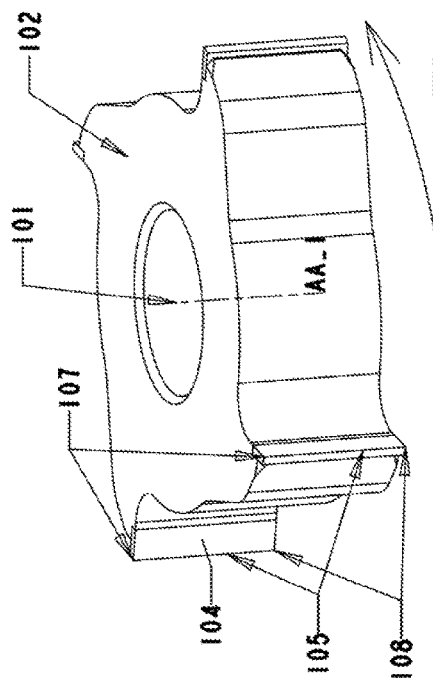
FIG. 9 is a perspective view of the tool of FIG. 7.

In the case of the invention the cutting tool is made up of two basic parts that are illustrated in FIGS. 7-20 and identified in the same fashion throughout this document. The first part being the tool body (102). In this case the tool consists of a one piece body but may also be made up of several body parts bolted or otherwise joined together to act as one cutting tool. The other part is the cutting plate or tip (103) which is affixed to the tool body (102) by various possible methods as described above. The cutting tool would consist of one or more of these tips arranged in various ways depending on the cutting application. In the case of the invention the tip is made of an ultra-hard material Polycrystalline Diamond (PCD). Each tip possesses certain features that are illustrated in FIGS. 7-9 and identified in the same fashion throughout this document. The features are: the tip itself (103), the rake face (104), the flank (106) which is created by the clearance angle (CA) during tool sharpening, and the cutting edge (105) which is the edge created by the intersection of the rake face (104) and the flank (106). The cutting edge (105) runs the length of the tip from (107) to (108).

FIGS. 10-12 show essentially the same cutting tool except the cutting length is now made up of more than one row of tips where the rows overlap each other so as to not leave a gap in the cut. The tips are also now on an inclination angle (IA) where the cutting edge is now at an angle relative to the rotational centerline. These figures show two rows with the inclination angles of the two rows at opposite angles to each other. Tools may have any number of rows and the rows may have an inclination angle in either direction.

In general terms increasing either the rake angle (RA) or the inclination angle (IA) will yield a cleaner cut, require less power, generate less noise, and create less chipping of the edges of the material being machined. Increasing the rake angle (RA) improves cut quality in all the above described ways but achieves the improved cut quality by creating a sharper cutting edge (WA) which tends to break down and become dull more quickly. Increasing the inclination angle improves the cut quality in all the above described ways as well but with less detrimental effect on the edge sharpness and life. Therefore it has generally been advantageous to increase primarily the inclination angle in order to improve cut quality. Inclination angle (IA) improves cut quality because the cutting edge (105) enters the material being cut gradually rather than hitting the work piece all at one time. As the tool rotates the point of contact with the work piece moves along the cutting edge (105) as the cut progresses. This creates a shearing or scissor effect that yields a cleaner cut as compared to the non-inclined edge shown in FIGS. 7-9 that acts more in the manor of a chisel. Due to the gradual progress of the chip being removed and some part of the cutting force being directed axially this creates a cutting condition that is "freer" and is less likely to pull out chunks of the work piece material. In the case of FIGS. 10-12 when the inclination angle is directed into the faces of the work piece it is also far less likely to cause edge chipping of the work piece edges. This is particularly true with materials that have faces laminated with a different material such as veneers, high pressure laminates, paper, etc.

In the past although a higher inclination angle would be preferable most tools were produced at a maximum inclination angle of 45 degrees as shown in FIG. 7.

Figure 15:
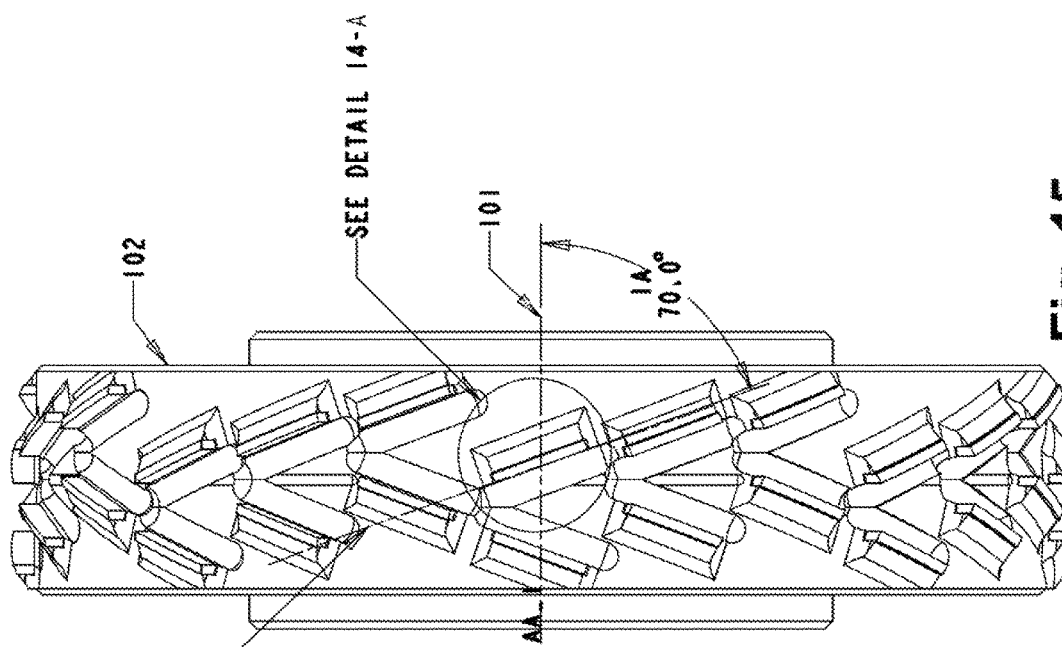
FIG. 15 is a side plan view of a further cutting tool.
Figure 14:
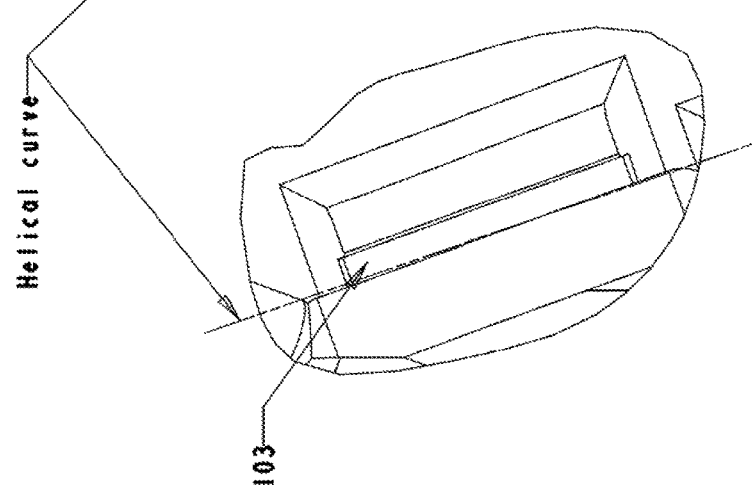
FIG. 14 is a close up fragmentary view of the cutting tool in FIG. 15.

After the machine software improvements became widely available in early 2011, tooling companies began producing cutting tools with brazed in PCD tips at inclination angles considerably over 45 degrees and routinely at 70 degrees (see FIG. 15).

However all these tools up until this point incorporated a cutting tip that featured a flat/planar rake face (104). This was believed to be the only possible or practical way to make these tools due to the fact the PCD material blanks are only produced as flat by the material suppliers. Since the PCD material is considered ultra-hard, and is only supplied in flat blanks, it was not considered practical to incorporate tips of this material into cutting tools with anything other than a flat/planar rake face (104).

The present disclosure includes a cutting tool that incorporates PCD cutting tips (103) at inclination angles (IA) above 45 degrees but with the added characteristic of having a profiled, curved, in the below examples, concave or convex, or irregular (non planar) rake face (104). Since the PCD material is difficult to cut and not available in anything other than flat blanks we achieve this by an additional step in the processing of the tips prior to attaching them to the tool body. Adding this process step also required the design of special fixtures to hold the tips and allow them to have the curved rake face added before brazing them into the tool body.

Figure 17:
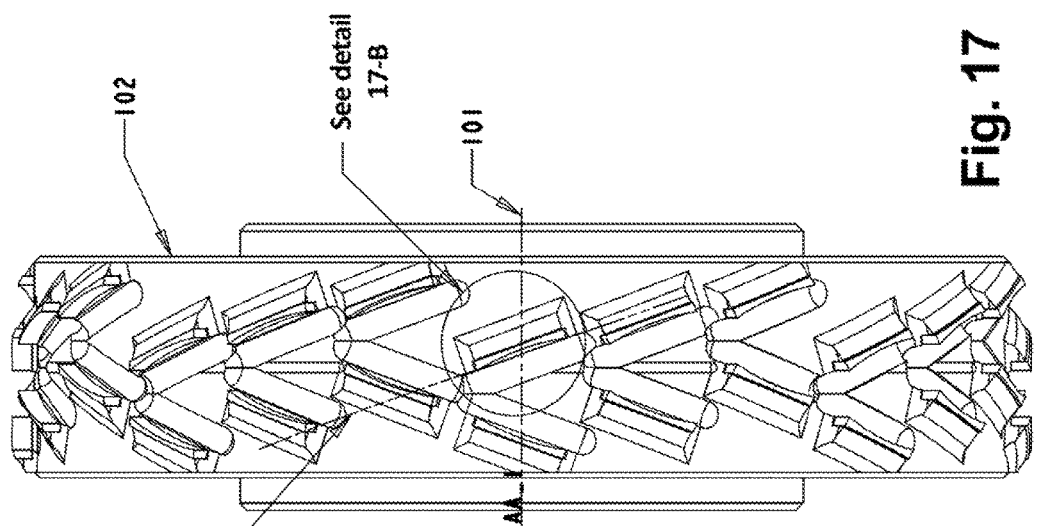
FIG. 17 is a side plan view of a further cutting tool.

A commonly available PCD blank is a round, flat blank that is 74 mm diameter and 1.6 mm thick. An EDM process or other cutting method may be used to cut the rectangular shapes in order to be brazed into the tool body. The method disclosed has the round, flat PCD raw material blank to be cut into strips to be held in the final fixture design and then cut into individual rectangular tips while having the face curved. By doing this we achieve a cutting tip that is not of a flat/planar rake face as shown in FIGS. 7-15. As illustrated in FIGS. 16-17 this creates a cutting edge (105) that is also not helical. In comparing FIG. 14, detailed view to FIG. 16, detailed view, it may be noted that the structure in FIG. 16 is less an approximation of a helical cutting edge then when using tips with a flat/planar rake face (104).

The differences is further clarified by comparing FIGS. 18-21 showing a flat/planar rake face to FIGS. 22-25 which show the rake face created to profile the tips, FIGS. 16 and 22 shows the profiled/concave rake face tip 105 (exaggerated for visibility) in the tool body as viewed from the flank 106 side with the cutting edge 105 visible. Note that convex, not shown, is also an effective profiling of the rake face FIG. 18 shows the flat/planar rake face tip in the tool body as viewed from the flank (106) side with the cutting edge (105) visible. FIG. 20 shows the flat/planar rake face tip in the tool body as viewed from the rake face (104) with the cutting edge (105) visible. FIG. 20 shows the flat/planar rake face tip separate from the tool body. The view in FIG. 20 shows the tip from the flank (106) side with the cutting edge (105) visible. From this view it is clear the rake face is flat and the cutting tip is of a uniform thickness. The view in FIG. 21 shows the tip from the rake face (104) side with the cutting edge (105) visible. Below this view the sections FIGS. 21a X-1, 21b X-2, and 21c X-3 show the tip is of the same thickness at all three sections and is in fact sections of a surface that is flat/planar throughout its entire surface area. FIG. 22 shows the profiled/concave rake face tip in the tool body as viewed from the flank (106) side with the cutting edge (105) visible. FIGS. 16 and 22 shows the profiled/concave rake face tip 105 exaggerated for visibility. In the case of a concave or convex tip face the height/thickness of the PCD (diamond) portion of the tip is typically 20 mills. The face is formed or ground to a minimum depth of 15 mils, i.e. the hollowing or dome of the face is 5 mils for 25% of the thickness. In theory this depth could be even greater, to 30, 35, 40, 45, 50, 55, 60, 65, 75, 80, 85, 90, or 95% of the thickness, but in the case of concave hollowing at least, the remaining thickness may lose integrity. FIG. 23 shows the profiled/concave rake face tip in the tool body as viewed from the rake face (104) with the cutting edge (105) visible. FIG. 25 shows the profiled/concave rake face tip separate from the tool body. The view in FIG. 25 shows from the flank (106) side with the cutting edge (105) visible. From this view it is clear the rake face is curved/concave and the cutting tip varies in thickness. The view in FIG. 25 shown from the rake face (104) side with the cutting edge (105) visible. Below this view sections FIG. 25a X-1, FIG. 25b X-2, and FIG. 25c X-3 show the tip varies in thickness at all three sections and is in fact curved throughout its entire surface area.

The present disclosure improves on a previous Ledermann invention for high shear angle tools through the above stated additional process step to utilize a cutting tool with non-flat/non-planer rake faces. The present disclosure is an improvement in at least two ways.

The present design improves on previous designs through increased tool run life. A probable reason for this is the additional linear length of the cutting surface. In the Ledermann disclosure, for example, one feature that provides improved run life over more traditional tools designs is for a given width of cut or portion of the cut width each tip covers, the already developed high shear tools spread the actual linear length of the cutting edge on each tip out over a longer distance. This difference in cutting edge length for the same cutting width between the high shear design (in this case 70 degrees) and a tool with no shear in the design is shown in the graph in FIG. 30. By utilizing the additional process to create a non-planer rake face in the tips the present design adds length to the actual cutting edge of the tips as compared to the high shear planner tips. This difference is represented in the graph in FIG. 31. This spreads out the amount of cutting each tip does while machining a given amount of material and thus increases edge life.

Figure 32:
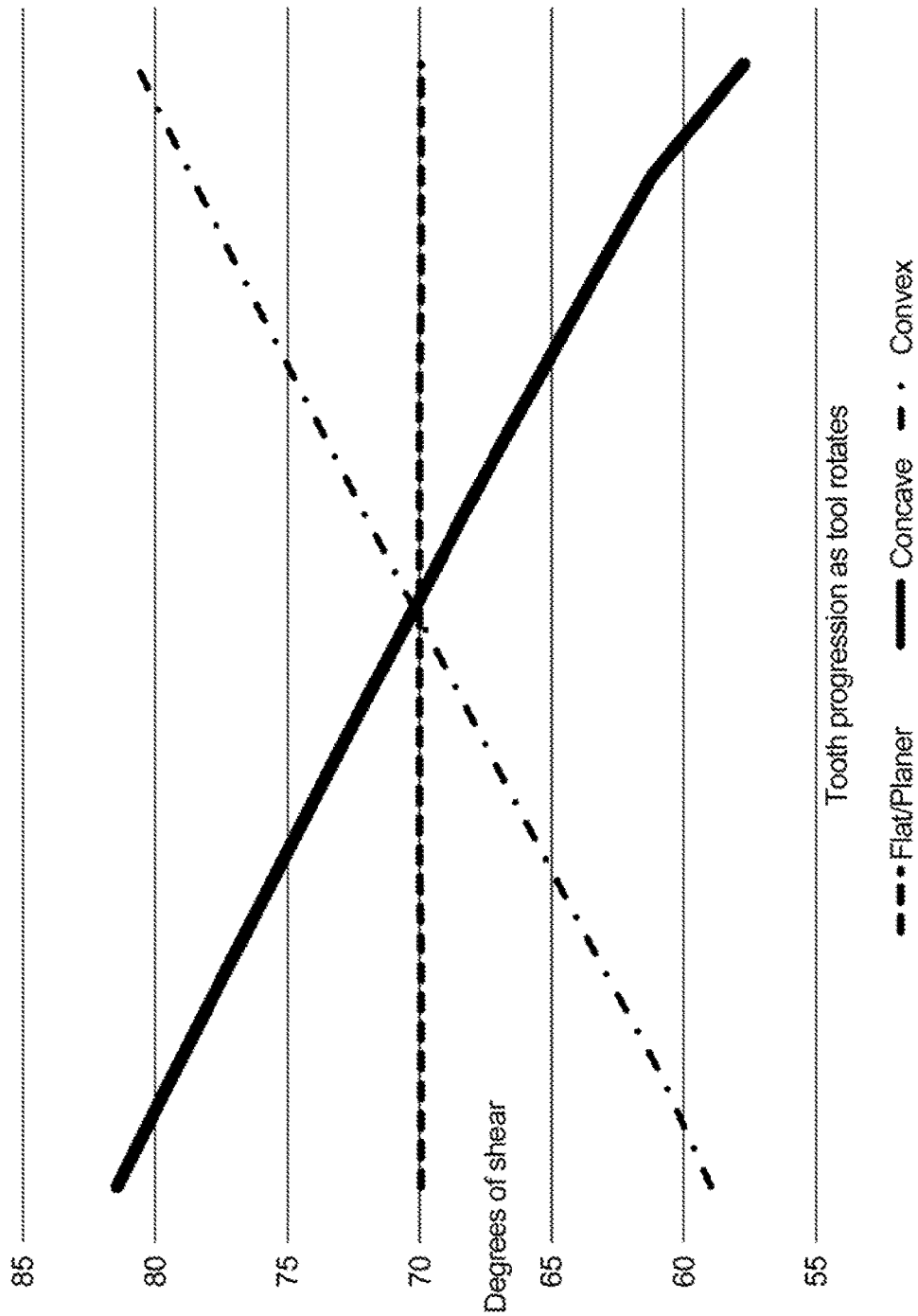
FIG. 32 is a table comparing degrees of shear angle (vertical axis) at point of contact with the workpiece as the tool rotates (longitudinal axis). It can be seen that the shear angle remains constant through the cut with a planar tip, but with convex the angle increases and with concave, the angle decreases.

The present design also improves on previous designs through improved cut quality. In existing high shear designs cut quality is improved in part by the fact that when using a flat tip the rake and shear angles (IA) change at the point of contact with the work piece as the tool rotates creating shearing and peeling effects. This also differentiates this design from helical tools because with helical tools all related cutting angles remain constant. In the present design incorporating a curved rake face the shear angle changes in a far more dramatic way relative to the point of contact with the work piece as the tool rotates. The difference in shear angle at the rake face between the current high shear designs and the present improved design is shown in FIG. 32. With the flat/planer rake face tip the point of contact shear angle tends to increase from the leading edge of the tip, peak at the tip center, then once the tool rotation has caused the point of contact to pass tip center the angle decreases slightly back to approximately the same angle where it was when the leading end of the tip entered the cut. In the present disclosure with the curved rake face design, the shear angle changes as the tool rotation causes the tip to progress through the cut. When the tip center is rotated to the point of contact with the workpiece all three tip designs have a shear angle relative to the tool centerline of approximately 70 degrees. With the present design with curved rake face, the shear angle prior to and after this point changes significantly. It should be noted that depending on which way (concave/convex) the tip is curved we can cause the angle to either increase or decrease as the tool rotates.

Figure 30:
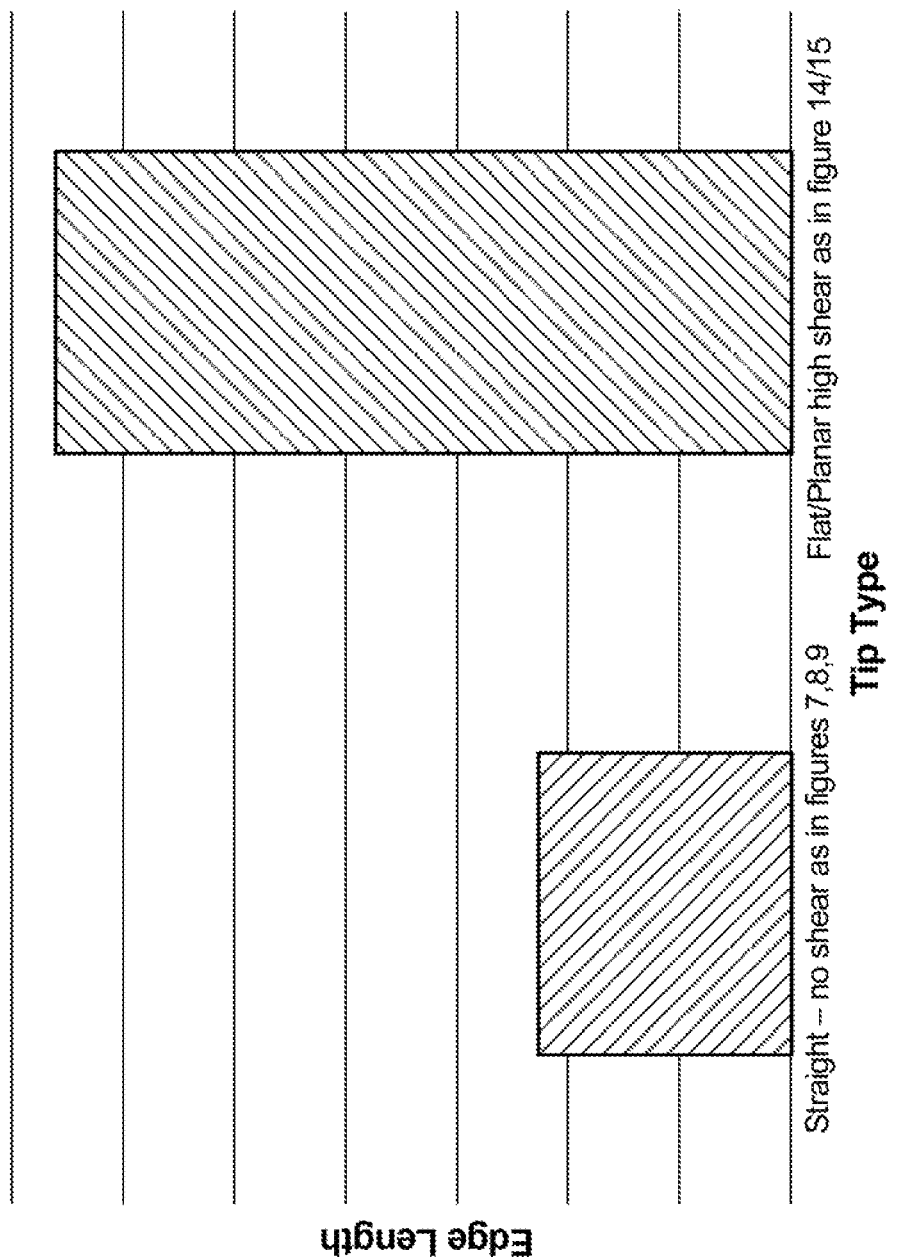
FIG. 30 is a table showing the relative edge length (vertical-axis) comparing a straight cutting tip vs a planar/flat high shear cutting tip, showing that high shear provides more cutting length in contact with the work piece.

FIG. 30 is a table showing the relative edge length (vertical-axis) comparing a straight cutting tip vs a planar/flat high shear cutting tip, showing that high shear provides more cutting length in contact with the work piece.

Figure 31:
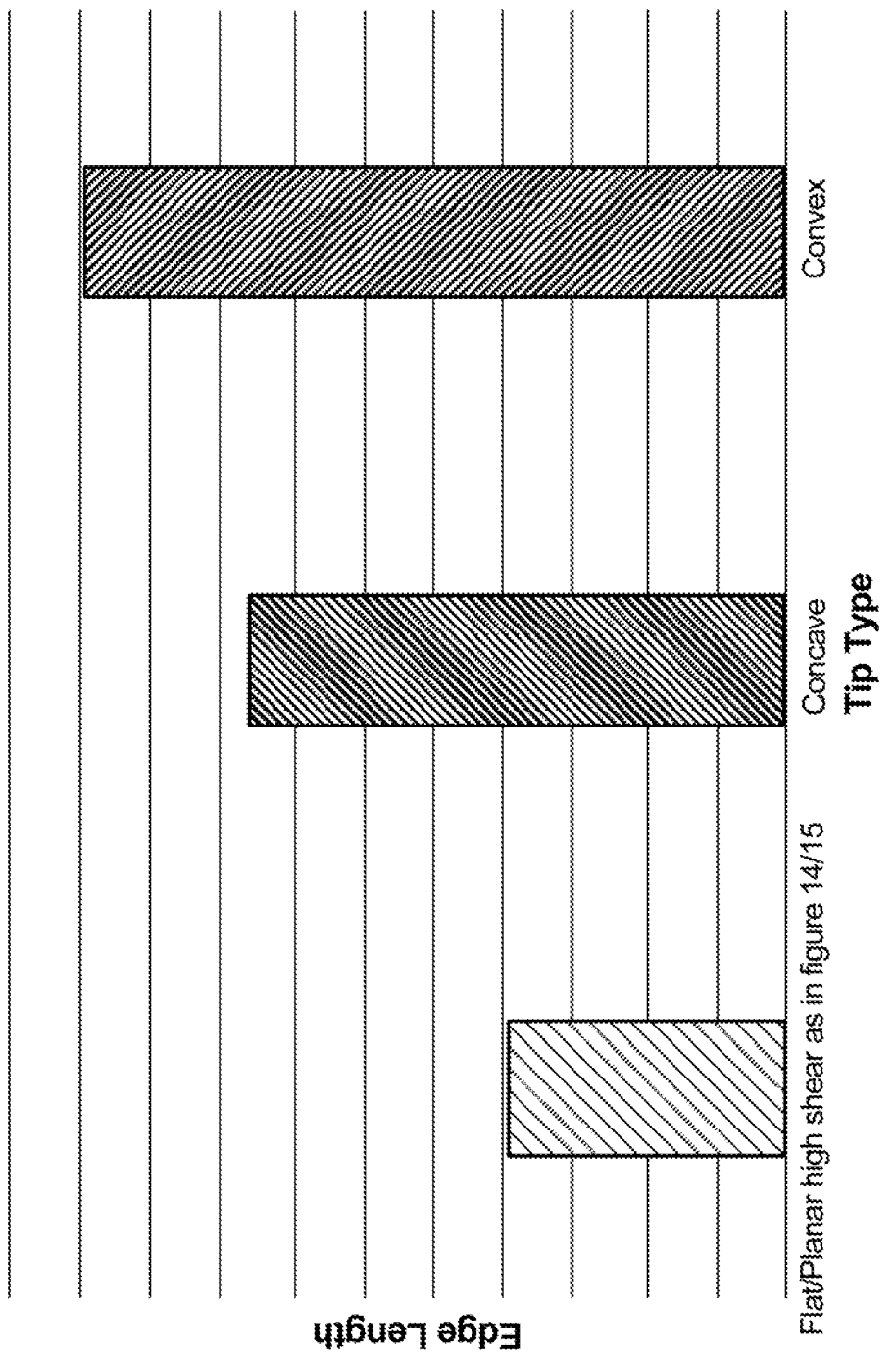
FIG. 31 is a table comparing the high shear planar tip of FIG. 26 with a high shear cutting tool with concave and convex profile cutting edges. The concave and even more so, the convex profile is relatively longer.

FIG. 31 is a table comparing the high shear planar tip of FIGS. 26-29 with a high shear cutting tool with concave and convex profile cutting edges. The concave profile, and even more so, the convex profile, is relatively longer.

FIG. 32 is a table comparing degrees of shear angle (vertical axis) at point of contact with the workpiece as the tool rotates (longitudinal axis). It can be seen that the shear angle remains constant through the cut with a planar tip, but with convex the angle increases and with concave, the angle decreases.

By either accelerating or decelerating the shear as the cut progresses this allows the curvature of the tip to be tailored to the application needed. Change in tip curvature, including complex curves like sinusoidal or serrated, can affect the flow of chips away from the workpiece. Better flow reduces heat and makes waste management easier. In cutting there is a pre-splitting problem, i.e. that the workpiece (especially wood) will split or be damages ahead of the cutting tool. The curved tip tends to minimize this problem.

It is also noted that there is likely to be a decrease in power consumption and noise levels with a curved cutting tip. Lower power demand of even a few percent can dramatically increase the drive motor's useful life. Of course noise reduction is desirable for the machine operators, but it also typically indicates that the cut is cleaner, with lower cutting resistance, and with lower tool temperature, which contributes to longer tool life.

It is important to remember, that on an industrial scale, these factors are extremely important to the quality of the cut, the energy usage of the cutting machine, temperature and tool/tip life.

The description of the invention and its applications as set forth herein is illustrative and is not intended to limit the scope of the invention. Variations and modifications of the embodiments disclosed herein are possible and practical alternatives to and equivalents of the various elements of the embodiments would be understood to those of ordinary skill in the art upon study of this patent document. These and other variations and modifications of the embodiments disclosed herein may be made without departing from the scope and spirit of the invention.

The invention claimed is:

1. A polycrystalline diamond (PCD) cutting tool for shaping a workpiece, the tool comprising:
   a cylindrical body having a central rotational axis with a central midline, an outer peripheral surface;
   a plurality of overlapping cutting tips each having first and second ends and a rake face between the ends, said ends being occluded from engaging said workpiece by virtue of the overlapping tips, said cutting tips extending from said surface including a first upper set of tips generally in at least one row oriented at a shear angle, and
   said cutting tips including a planar base portion, first and second end walls extending at right angles from said base portion, and a concave non-planar polycrystalline diamond (PCD) rake face extending between said end walls;
wherein the cutting tips engage a workpiece for cutting as the tool rotates and the concave rake face cuts parallel to the direction of feed of the workpiece causing the cut to progress from one end of the tip to the other along the concave rake face.

2. A polycrystalline diamond (PCD) cutting tool for shaping a workpiece, comprising:
- a cylindrical body having a central rotational axis with a central midline, an outer peripheral surface;
- a plurality of overlapping concave non-planar polycrystalline diamond (PCD) cutting tips affixed to said body, said tips being oriented in a row and each having:
- first and second tip ends and a top rake face between said tip ends;
- said top rake face surface being concave and non-planar end to end,
- said tip ends being occluded and protected from engaging the workpiece by virtue of being overlapping;
- a planar base portion for affixation to said body,
- first and second planar sidewalls being at right angles to said base portion, and
- said sidewalls having upper ends distant from said base portion with said upper ends forming sharp upper corners between the concave surface and sidewalls;
wherein the cutting tips engages a workpiece for cutting as the tool rotates and the rake face between the tip ends tip cuts parallel to the direction of feed of the workpiece causing the cut to progress from one end of the tip to the other along the concave rake face.

3. The cutting tool of claim 2 wherein the cylindrical body includes a plurality of cutting tip support structures extending outwardly from the body peripheral surface and wherein said support structures have a support bed surface upon which a cutting tip is affixed, said bed surface having first and second spaced apart end walls and where said end walls of said base and sidewalls of said tip are aligned to be co-planar, so that all parts of the cutting tip are fully supported by said bed.

4. The cutting tool of claim 2 wherein the rake face is comprised on a plurality of end to end planar segments which together form a generally concave trough surface.

5. The cutting tool of claim 2 wherein the tips are removable and replaceable.

6. The cutting tool of claim 2 wherein the tips are affixed to the tool by brazing.

7. The cutting device of claim 2 wherein at least one of said tip includes:
 a. a generally vertical leading wall with a cutting edge;
 b. a first sloping wall abutting said cutting edge and sloping downwardly toward the central axis and away from said cutting edge.

8. The cutting device of claim 2 wherein at least one of said tip includes:
 a. a generally vertical leading wall with a rake face tip;
 b. a first sloping wall abutting said rake face tip and sloping downwardly toward the central axis and away from said rake face tip.

* * * * *